April 27, 1943.  W. F. VERNON  2,317,656
AUTOMOBILE VANITY MIRROR
Filed April 21, 1941
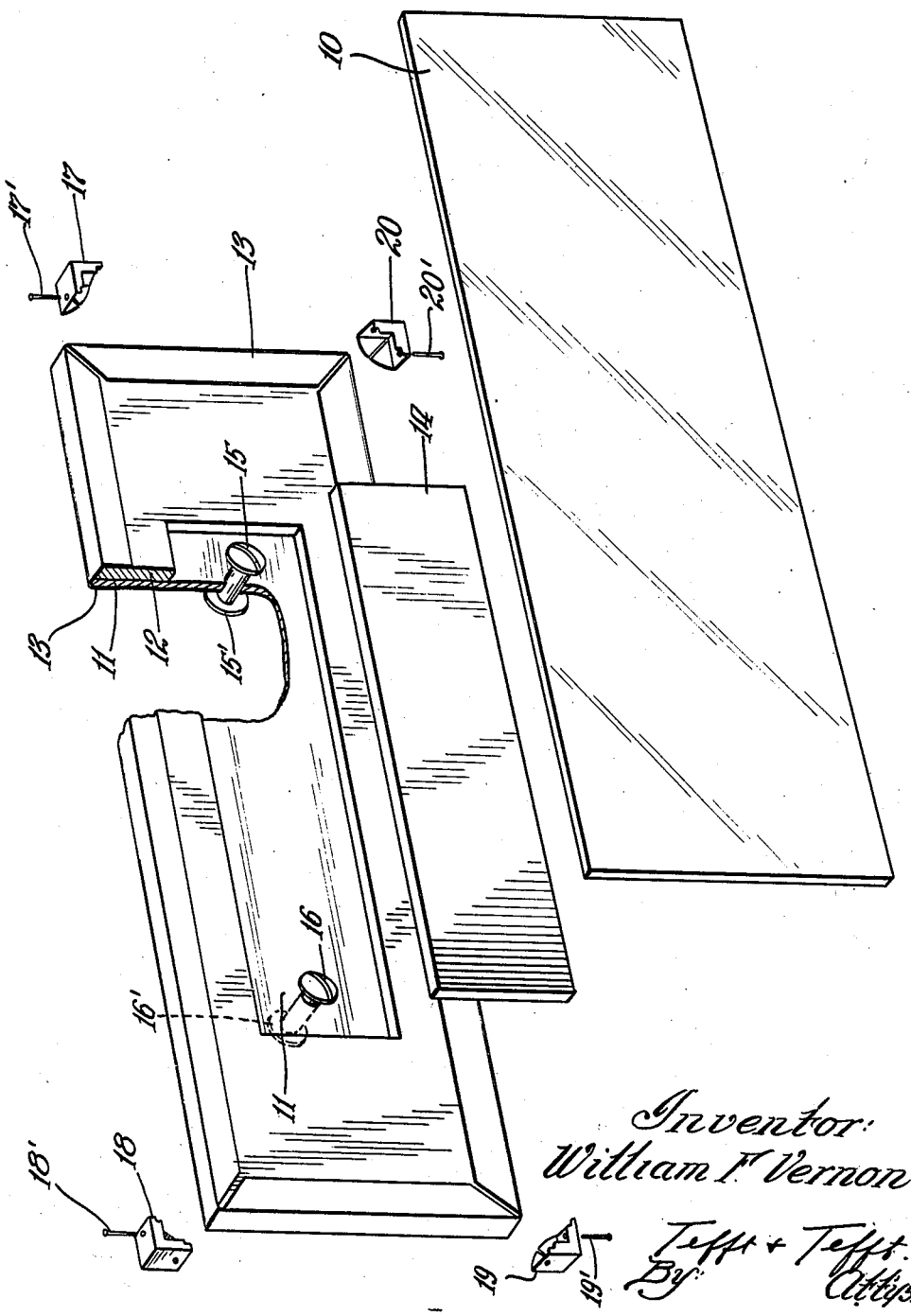

Patented Apr. 27, 1943

2,317,656

UNITED STATES PATENT OFFICE 2,317,656

AUTOMOBILE VANITY MIRROR

William F. Vernon, Newton, Iowa

Application April 21, 1941, Serial No. 389,505

1 Claim. (Cl. 88—98)

This invention relates to an automobile mirror adapted to be mounted on the conventional sun visor of automobiles.

Inasmuch as sun visors normally are subject to rough usage due to the adjustments of the visor, such mirrors which are commonly sold as accessories, are constructed rather sturdily from heavy glass and expensive spring mounting clips.

The particular object of this invention is to provide a thin glass mirror, flexibly mounted in a structure sufficiently low in cost that the device may be sold as an advertising novelty. Other objects and benefits will be disclosed in the following description and drawing, showing the various parts of my mirror in perspective, arranged as they would be assembled, as will later be explained.

Now referring to the drawing, I designate a conventional thin glass mirror by the numeral 10. This mirror has the usual reflector surface on its back, and otherwise is a conventional thin glass cheap mirror. As an advertising novelty, the mirror may carry certain advertising indicia which will be well understood. The back of the mirror is a cardboard mounting consisting of a rather thin cardboard back 11, and thicker cardboard front 12, held together on the outer edges by the black tape binding 13. In the front center section of the thick cardboard 12, there is a cut-out section 14, which is removed to insert through holes in the back 11, the mounting screws 15 and 16. After these screws are inserted through the holes in the back 11, the cut-out section 14 is replaced, and inasmuch as the heads of the screws 15 and 16 are covered, a smooth cardboard backing for the mirror 10 is provided. The mounting is made by inserting the screws 15 or 16 through the sun visors, which are usually cardboard covered with cloth and the entire assembly held in place by the nut members 15' and 16'. It will be appreciated that inasmuch as the support is from the thin back cardboard section 11, the mounting thus provided is moderately flexible, and any strains imposed on the assembled mirror will be absorbed by flexing of the thin back section 11, rather than the thin glass mirror 10. This is a novel safety mounting which is low in cost, and produces an unexpected and effective result. The back and mirror sections are held together by the corner clips 17, 18, 19 and 20, which are held in position by the nails 17', 18', 19' and 20', driven into the thick cardboard section 12. It will thus be understood that the glass is held on the backing at its corners which, with the flexible mounting above described, provides a novel, low cost structure which permits the device to be sold as an advertising novelty.

Having thus described my invention, I claim:

In a flexible mirror mounting, a thin back cardboard, a relatively thick front cardboard, a tape around the edges of said cardboards holding them together as a unit, a removable center section in the thick front section, mounting bolts inserted through the rear thin section with the bolt heads covered by the removable section, a thin glass mirror fitting the cardboard mount, metallic corner clips to hold the mirror on the mount, and nails inserted through the corner clips and into the front cardboard to fasten the clips whereby the mirror is flexibly supported from the thin back cardboard.

WILLIAM F. VERNON.